United States Patent
Jacobi et al.

(10) Patent No.: US 9,205,740 B2
(45) Date of Patent: Dec. 8, 2015

(54) MOTOR VEHICLE, INDICATING DEVICE AND OPERATING METHOD

(75) Inventors: Stefan Jacobi, Boeblingen (DE); Rolf Hofmann, Weil der Stadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 1616 days.

(21) Appl. No.: 12/171,902

(22) Filed: Jul. 11, 2008

(65) Prior Publication Data

US 2009/0030582 A1   Jan. 29, 2009

(30) Foreign Application Priority Data

Jul. 28, 2007  (DE) .......................... 10 2007 035 426

(51) Int. Cl.
*G06F 17/00* (2006.01)
*B60K 26/02* (2006.01)
*G01L 5/13* (2006.01)

(52) U.S. Cl.
CPC .................. *B60K 26/021* (2013.01); *G01L 5/13* (2013.01); *B60W 2510/0208* (2013.01); *B60W 2510/0657* (2013.01)

(58) Field of Classification Search
USPC ............. 701/99; 340/438, 439, 455, 461, 459
See application file for complete search history.

(56) References Cited

U.S. PATENT DOCUMENTS

| | | | | |
|---|---|---|---|---|
| 4,149,141 A * | 4/1979 | Tanimura | ....................... | 340/464 |
| 4,327,577 A * | 5/1982 | Fiala | .......................... | 73/114.53 |
| 5,309,139 A * | 5/1994 | Austin | ......................... | 340/462 |
| 5,781,872 A * | 7/1998 | Konishi et al. | ................... | 701/36 |
| 6,226,588 B1 * | 5/2001 | Teramura et al. | ............... | 701/93 |
| 6,480,106 B1 * | 11/2002 | Crombez et al. | .............. | 340/461 |
| 6,600,413 B1 * | 7/2003 | Lo | ................................. | 340/439 |
| 6,601,442 B1 * | 8/2003 | Decker et al. | ............. | 73/114.15 |
| 6,751,534 B2 * | 6/2004 | Robichaux et al. | ............ | 701/22 |
| 6,849,029 B2 | 2/2005 | Loeffler | | |
| 6,918,315 B2 | 7/2005 | Noeth et al. | | |
| 7,046,133 B2 * | 5/2006 | Weast et al. | .................... | 340/467 |
| 7,093,587 B2 * | 8/2006 | Glora et al. | ................... | 123/492 |
| 7,145,442 B1 * | 12/2006 | Wai | ............................... | 340/438 |
| 8,116,971 B2 * | 2/2012 | Chen et al. | ..................... | 701/123 |
| 8,346,476 B2 * | 1/2013 | Taguchi et al. | ............... | 701/424 |
| 2004/0045773 A1 * | 3/2004 | Crough | ........................ | 188/3 H |
| 2005/0128065 A1 * | 6/2005 | Kolpasky et al. | ............. | 340/461 |
| 2005/0278079 A1 * | 12/2005 | Maguire | ........................... | 701/1 |
| 2006/0250902 A1 * | 11/2006 | Bender et al. | ..................... | 369/1 |
| 2007/0143002 A1 * | 6/2007 | Crowell et al. | ............... | 701/123 |
| 2007/0203625 A1 * | 8/2007 | Quigley et al. | ................. | 701/33 |

(Continued)

FOREIGN PATENT DOCUMENTS

DE    101 60 819 A1    6/2003
DE    102 11 968 A1    10/2003

(Continued)

*Primary Examiner* — Thomas G Black
*Assistant Examiner* — Peter D Nolan
(74) *Attorney, Agent, or Firm* — Gerald E. Hespos; Michael J. Porco; Matthew T. Hespos

(57) ABSTRACT

An indicating device for a motor vehicle and an operating method are provided. The motor vehicle includes a drive train with at least one drive unit. The indicating device shows in a differentiable manner to the driver the drive states of accelerating, unpowered driving (coasting) and decelerating using the drive train, and at a minimum signals to the driver when the coasting state exists so as to permit the driver to optimize efficient use of the vehicle.

2 Claims, 3 Drawing Sheets

(56) References Cited

U.S. PATENT DOCUMENTS

2007/0256481 A1* 11/2007 Nishiyama et al. ............. 73/113
2009/0243827 A1* 10/2009 Burke et al. .................. 340/439

FOREIGN PATENT DOCUMENTS

DE   10 2004 022 266 A1   12/2005
DE   10 2005 045 265 A1   3/2007

* cited by examiner

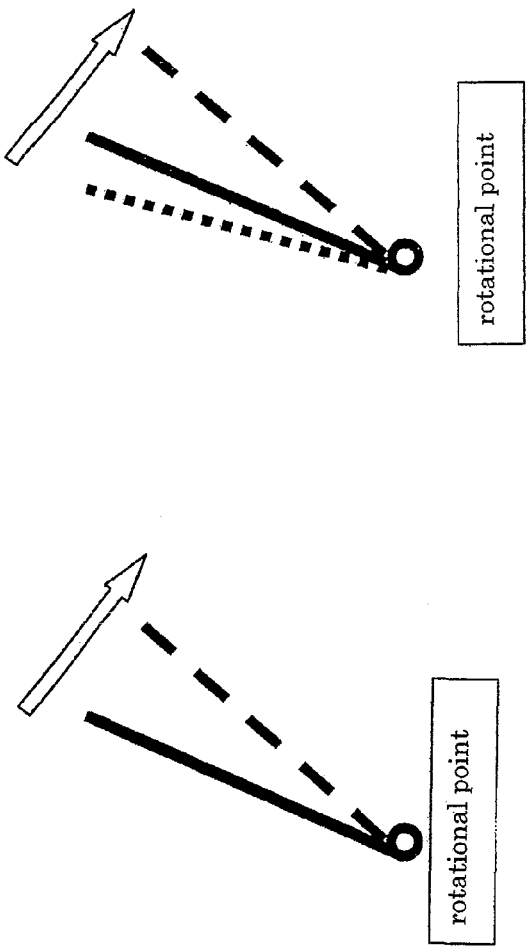

MOTOR VEHICLE, INDICATING DEVICE AND OPERATING METHOD

CROSS-REFERENCE TO RELATED APPLICATIONS

This application claims the priority of German Application No. 10 2007 035 426.8, filed Jul. 28, 2007, the disclosure of which is expressly incorporated by reference herein.

BACKGROUND OF THE INVENTION

The present invention relates to a motor vehicle, an indicating device and an operating method.

In this case the motor vehicle comprises at least one drive unit, which may be disengaged from the rest of the drive train by, for example, a suitable clutch. The object of the invention is to indicate to the driver when he is in a running state, in which the vehicle would continue to drive with the same longitudinal acceleration, even if the clutch between the drive unit and the rest of the drive train were disengaged. This running state is called "coasting" and makes possible an operating mode that saves energy by switching off the drive unit when the clutch is disengaged or by operating the drive unit at least at a reduced speed, normally idling speed.

In principle, three different drive states can be distinguished in a motor vehicle that is, accelerating, unpowered driving ("coasting") and decelerating. It is known that coasting is the most energy efficient mode of operation, if at the same time the drive motor is disengaged from the drive train and is switched off or at least is operated at the lowest possible speed. In principle, this operating mode may be used in any conventional vehicle. In vehicles with a manually operated transmission, this operating mode is initiated by stepping on the clutch pedal and releasing the drive pedal. In vehicles with automatic transmission, this mode can be initiated by shifting into the driving position N, instead of actuating the clutch pedal. Vehicles with a hybrid drive will use this operating mode automatically, as often as possible. Yet in this context there are two problems. At any driving speed the unpowered state is a narrow range of the vehicle longitudinal acceleration—more precisely, only a single operating point, characterized by a position of the drive pedal for each engine speed. For this reason the energy saving coasting mode in the case of an automatic activation can be activated only very infrequently, if no influence is to be put on the driver's desired longitudinal acceleration.

Of course, hybrid vehicles have the possibility of covering a certain range of the longitudinal deceleration by means of the additional electric motor when the internal combustion engine is switched off. Yet, even recuperation and then use of the recuperated energy is significantly less efficient than coasting, since during coasting the kinetic energy is maintained and is reduced only by unavoidable driving resistances. However, in the case of recuperation only approximately 50% of the recuperated energy or less can be used again at a later date for accelerating. Therefore, even in the case of hybrid vehicles it is logical to use the energy efficient coasting mode as often as possible. If the driver performs the activation, there is the problem that it is difficult for him to detect this state, so that, on the one hand, he will not often use the energy saving operating mode and, on the other hand, he will activate from time to time the energy saving coasting mode only to ascertain then that the vehicle accelerates unintentionally with more or less speed than intended.

If the coasting state can be indicated to the driver, then he is in a position to induce or maintain depending on the driving situation this state by changing his manner of driving. That is, he can dispense with accelerating slightly more or less than he would have without any information about the relationships. Therefore, in the case of an automatic activation of the energy efficient coasting mode, this operating mode may be active significantly more often similarly when activated by the driver, since otherwise he would not even take the opportunity to activate without the influencing of the longitudinal dynamics.

SUMMARY OF THE INVENTION

The invention provides a dedicated indicating device for indicating the momentary drive state in order to assist the driver in using, as often as possible, the energy efficient coasting mode. In other words, the driver is offered the possibility of deciding for himself at any time the extent to which he wants to adapt his driving style in order to use the coasting mode. Thus, in the case of a hybrid vehicle the degree of deceleration and charging of the electric energy accumulator can also be specified indirectly by the driver. In this case the invention is based on the recognition that a vehicle system is often not able to use the energy efficient coasting mode, if it correctly considers the driver's inputs with respect to the vehicle longitudinal dynamics. In contrast, the driver always has a comprehensive overview of the real driving situation. Therefore, he can make a decision on the basis of what he anticipates will happen; and he can adapt his way of driving to match the driving situation and his requests. That is, since he knows the real drive state accelerating, coasting or decelerating, he can decide as a function of the driving situation whether he wants to dispense with a negligible acceleration or deceleration in order to use the energy efficient coasting mode. To this end, the dedicated indicating device is designed, according to the invention, to indicate directly to the driver, when a drive unit is not introducing an accelerating and/or decelerating torque into the drive train. This separate indication of coasting by means of a dedicated indicating device, which is provided exclusively for this function, will offer the driver optimal assistance. Thus, in this context "dedicated" has the normal dictionary definition of "set aside for special use," namely the indication of the energy efficient coasting mode.

The indicating device is designed in such an advantageous manner that it indicates to the driver the operating ranges accelerating, free rolling (coasting) and decelerating with engine torque (of the internal combustion engine and/or optionally the electric motor). Hence, a prolonged free rolling is possible in order to achieve an optimum of energy efficiency. Therefore, with this information the driver can decide on the basis of his comprehensive overview of the real driving situation whether he wants to use the coasting mode.

An advantageous, very simple embodiment of the invention provides that the indicating device renders the three basic operating states accelerating, coasting and decelerating by means of a visual display. In the simplest case this display is a light emitting diode, which signals the state of the nonpowered drive. In this case the driver should know for optimal use of the coasting mode, when the vehicle is in the accelerating or decelerating state. That is, whether at the signal of the coasting mode he has approached the coasting state from the acceleration or deceleration range. This requires paying some attention to the visual signal.

An expansion constitutes an indicating device that can indicate at least three states in a way that can be differentiated for example, a two color light emitting diode that shows acceleration with a different color than deceleration and that extinguishes in the coasting state. Of course, it is possible to use other visual display means, with which the various drive states can be indicated or at least the coasting state can be signaled in a distinguishable manner. The basic advantage of this expansion lies in the driver's ability to recognize immediately upon looking at the indicating device the drive range, in which he currently is. Thus, he knows immediately whether he can reach the coasting state by depressing or releasing the drive pedal.

In order to render in greater detail the real drive state, the indicator may also be designed in multiple steps for example, using a plurality of light emitting diodes or continuously, for example, using a pointer instrument. As a result, the driver can be informed additionally that he is in the vicinity of the coasting state so that he may, if desired, adapt his driving even better to an energy saving way of driving.

The visual display of the real drive state can also be carried out by means of existing configurable indicating elements, such as a matrix display.

Another simple indicating device is an acoustic indicator. This type of indicator may be a simple signal tone, which indicates that the coasting state has been reached. In this case the driver should know for optimal use of the coasting operation when the vehicle is in the accelerating or decelerating state that is, at the sound of the signal tone whether he has approached the coasting state from the accelerating or decelerating range. In most driving situations this can be achieved with ease.

An expansion of the acoustic indication consists of designing this indicator in multiple steps or continuously in order to give as described above in the case of the visual display the driver more precise information about the real drive state. This can be done, for example, by varying the tone pitch or the sound.

Another preferred and very user friendly embodiment of the invention consists of using the user interface to specify the vehicle longitudinal acceleration usually the drive pedal in addition to the conventional purpose also for indicating the real drive state. To this end, the invention modifies the force-travel characteristics of the drive pedal in such a way that the driver can detect in the drive pedal that he has reached the coasting mode. This detection is achieved with a pressure point therefore, an increase in the counter-force upon moving the drive pedal forward and/or a reduction in the counter-force upon moving the drive pedal rearwards. The position of this pressure point must be variable, because it depends on the engine speed. Therefore, at different engine speeds the nonpowered state of the engine occurs at different positions of the drive pedal. Depending on the driving speed and the selected transmission ratio, the result is a respective position in the drive pedal, at which the engine neither accelerates nor decelerates.

Another type of integration into a drive pedal consists of designing the drive pedal in such a way that the coasting position is an unpowered position, and the drive pedal can be pushed from this position to the rear. The advantage of this embodiment is the possibility of the driver being able to take his foot off the drive pedal in the coasting mode even in the event of an automatic activation of the energy saving coasting mode. This can be achieved in that the hinge point of the drive pedal is not on its end or outside, but rather inside the pedal surface, so that when pressure is applied with the tip of the foot, the drive pedal is pushed forward, like a conventional drive pedal. When the foot is removed from the drive pedal, the drive pedal assumes the coasting position and from this position can be pushed rearwards by applying pressure with the heel of the foot in order to generate a braking torque, as is the case in conventional vehicles when the drive pedal is released. The range between coasting and rearmost position can be designed either without a reset force or with a reset effect in the direction of the coasting position. In the second case a snap-in device in the rearmost position ought to be provided, so that the engine decelerating effect can be maintained when changing over to the brake pedal.

In a simplified variant of this embodiment the zero torque position is always at the same point. An expanded version has the zero position as a function of the engine speed, as described above for the mono-directional drive pedal.

Instead of a drive pedal, the function can also be implemented with a hand operated operational control element for example a throttle twist grip in the case of a single track motor vehicle, a joystick-like lever or a lever of the type of a steering column switch. In this case a joystick for steering the vehicle can be designed in such a manner that it is possible to both accelerate and also to decelerate the vehicle. If the joystick is set in its neutral position and/or at a pressure point, this signifies coasting. If the joystick is pushed forward beyond the neutral position and/or the pressure point, the vehicle will be accelerated. If the joystick is pulled rearwards beyond the neutral position and/or the pressure point, the vehicle will be decelerated.

In a vehicle without a recuperation option the engine is preferably disengaged from the drive train and switched off when decelerating; and the respective deceleration is generated with the service brake. If this is not possible for technical reasons (brake load, it is necessary to run the engine because of the auxiliary units, etc.), the engine still has to be supplied with fuel between the coasting position of the drive pedal and the totally released position. In a hybrid vehicle the decelerating torque is normally generated by the generator by means of recuperation.

Described below is the operating method for conventional vehicles, which exhibit an Otto engine and which exhibit a defined allocation between the throttle flap position and the drive pedal position. In vehicles with a diesel engine or any other type of drive engine, the throttle flap is replaced by a corresponding actuator for example, the actuator of the fuel injection system. If there is no defined allocation between the drive pedal position and the throttle flap or the corresponding actuator, it is necessary to consider the resulting change in the drive pedal position.

The nonpowered state can be detected in two ways. As long as the engine is connected to the drive train, the delivered engine torque may be read by the engine control unit by way of the vehicle internal communication means, provided that such a communication exists. A small range of the positive and negative engine torque is then defined as the zero torque for signaling the coasting state.

If the zero torque cannot be read by the engine control unit, it is ascertained, according to the invention, by means of an engine characteristic graph, which shows the relationship between the drive pedal position and the engine speed when the engine is rotating freely thus, the drive pedal-speed characteristic curve, which is the result of a disengaged clutch.

In the case of an automatically activated coasting mode, this method has to be applied whenever the clutch is disengaged (FIG. 2). In this case the speed n of the side of the clutch that faces away from the engine is determined from the driving speed and the real transmission ratio. From this speed n a throttle flap position and/or a drive pedal position $s_s$ for the zero torque is clearly derived from the drive pedal-speed characteristic curve. If this position of the drive pedal is taken, then the coasting mode is indicated to the driver by means of one of the above described methods.

If the driver activates the coasting mode, for example, by opening the clutch and releasing the drive pedal, the coasting mode is always indicated irrespective of any other drive state and engine speed, as long as the driver does not leave this coasting mode again, for example, by closing the clutch.

In order to avoid in the event of an automatic activation of the coasting mode that the internal combustion engine is switched off too often and then re-started again after a short period of time, both a switch-off dead time for the activation of the coasting mode and a hysteresis Δs for the drive pedal position (FIG. 2A) are provided. In other words, instead of the zero torque position, a zero torque range of the drive pedal position is provided, which the driver has to observe for a defined period of time (switch-off dead time) by activating the drive pedal, so that a switch over to the coasting mode occurs. As an alternative or in addition, the limits of the zero torque range may be signaled to the driver as additional pressure points, which may be easier to overcome than the zero torque position. Thus, it is ensured that a random minor change in the drive pedal position cannot induce the engine to re-start.

It is possible to provide in an advantageous manner a switch-off dead time operational control element, with which the driver can set any desired switch-off dead time. It is also advantageous to provide an additional drive pedal hysteresis operational control element, with which the driver can set the drive pedal hysteresis.

The switch-off dead time operational control element and the drive pedal operational control element may also be combined in an advantageous manner. Then the result is an operational control element for the coasting indicating device, with which the degree of usage of the coasting mode can be adjusted to the individual case. Hence, this coasting operational control element exhibits two end positions. In the one end position the internal combustion engine is already switched off, when the drive pedal is in the zero torque position and/or in a wide range about this position for only a short period of time. In the other end position the system is totally switched off. Therefore, coasting is neither signaled nor automatically activated. This operational control element may exhibit an obvious pressure/locking point in order to signal even in a haptic manner to the driver the intended switch-off operation.

Of course, the adaptation of the switch-off dead time and hysteresis as well as other characteristic values, which describe the operational control characteristics and the indicating concept, may be provided not only with the aid of the coasting user interface, but also with any suitable user interface of the invention. Characteristic values may be presented to the driver or can be adjusted for the driver by the on-board computer.

In the case of a hybrid vehicle the indication by means of a haptic drive pedal makes it possible to expand the recuperation capability in that in the rear-most position of the drive pedal a vehicle deceleration is specified that is greater than that corresponding to the respective overrun torque of the engine. In the known operational control concepts for hybrid vehicles the reverse path is taken in order to improve the degree of the accelerating effect. That is, in the normal position of the selector lever of the automatic transmission the rearmost position of the drive pedal corresponds to a very slight deceleration, close to the position of the coasting mode, in order to use often operating states that are at least close to coasting. If the deceleration effect is desired, then a manual shift into another mode of the automatic transmission can be executed. In addition to the expanded use of recuperation, the strategy that is described here also achieves added comfort and convenience, because the driver does not have to change-over so often from the drive pedal to the brake pedal in order to achieve a somewhat higher deceleration.

Other objects, advantages and novel features of the present invention will become apparent from the following detailed description when considered in conjunction with the accompanying drawings.

BRIEF DESCRIPTION OF THE DRAWINGS

FIG. 1 is a schematic drawing of preferred embodiments of the present invention.

DETAILED DESCRIPTION

FIG. 1 is a schematic drawing of the haptic indication with the use of the user interface drive pedal. The drawings 1B and 1C show the embodiments of a haptic drive pedal. The rotational point of the drive pedal is illustrated by the small circles in FIG. 1. In the embodiments of the haptic drive pedal the conventional drive pedal is expanded in such a manner that a corresponding activation by, for example, an actuator, can signal to the driver the pedal positions, determined by the algorithm, in the form of a pressure point.

FIG. 1A shows a conventional drive pedal. The non-activated position that is, the position in which no force is applied corresponds to a deceleration with the drive unit.

FIG. 1B shows a drive pedal with a pressure point. In this case the non-activated position that is, the position in which no force is applied and which corresponds to coasting (the marked position) signifies a deceleration as a function of the braking torque of the drive unit.

FIG. 1C shows a bi-directional haptic drive pedal. The rotational point in the bi-directional haptic drive pedal is not on one end as in the case of the conventional drive pedal, but rather is shifted to its center.

All three embodiments, according to FIGS. 1A to 1C, are activated by the driver applying the ball of the foot in the direction of the arrow. In addition, the bi-directional haptic drive pedal, which may be activated by the driver applying his foot, may also be activated by the heel in the opposite direction (see the dotted line in FIG. 1C). If a braking torque (for example, by using an electric motor as a generator or by means of a service brake) is to be exerted on the drive train in order to decelerate the vehicle, the bi-directional haptic drive pedal is pushed rearwards by applying pressure with the heel.

Figure 3:
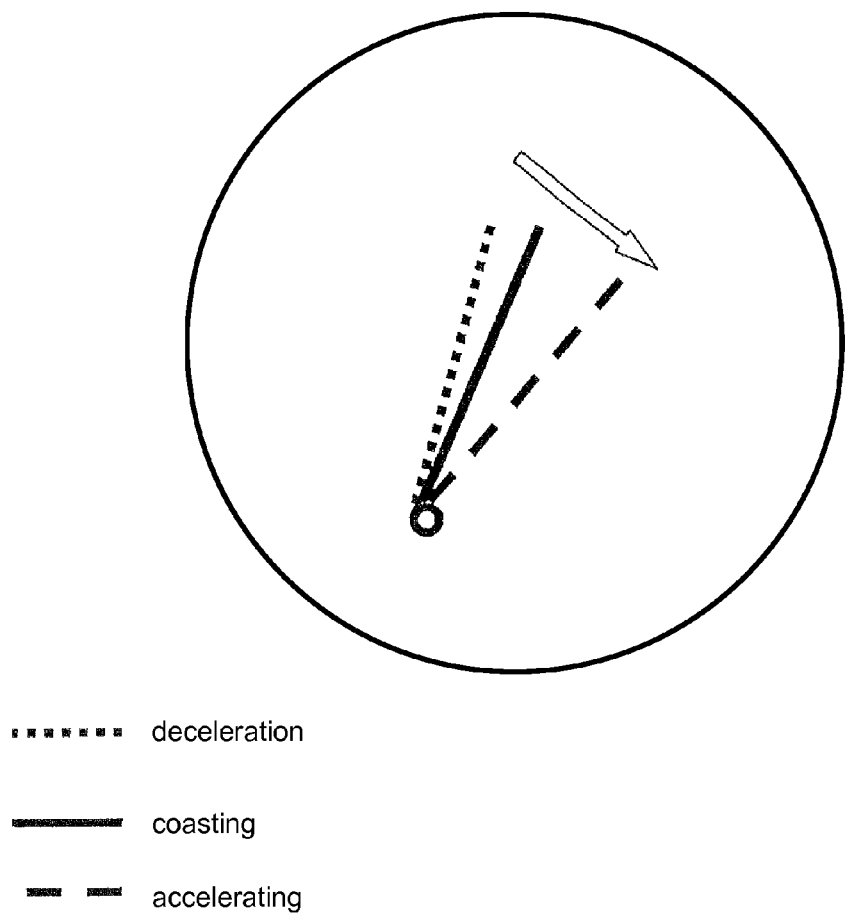
FIG. 3 is a schematic drawing of a visual indicator in accordance with the invention.

In both drawings of FIGS. 1B and 1C the result is a pedal position, with which the coasting mode is associated. If this pedal position is taken by the driver's foot, the drive train does not transfer a drive torque called the zero torque position, which corresponds to a drive state, in which the internal combustion engine neither accelerates nor decelerates the vehicle. In this drive state it is irrelevant whether the clutch is closed or open, because it does not affect the vehicle acceleration. For energy efficiency reasons, however, the clutch is open and the internal combustion engine is switched off for functions that relate to the coasting mode. Electric drive motors are also operated in the most energy saving state. This special, coasting-related function is also discussed below. FIG. 3 illustrates an optional way to convey to the driver the information that is conveyed in FIG. 1B. More particularly, the relationship between the driver's foot position on the accelerator pedal and the pedal position with which the coasting mode is associated is part of a visual display in FIG. 3. An advantageous, very simple embodiment of the invention provides that the indicating device renders the three basic operating states accelerating, coasting and decelerating as shown respectively by the right, center and left lines in the visual display of FIG. 3. In the simplest case this display is a light emitting diode, which signals the state of the nonpowered drive. In this case the driver should know for optimal use of the coasting mode, when the vehicle is in the accelerating or decelerating state. That is, whether at the signal of the coasting mode he has approached the coasting state (center line) from the acceleration or deceleration range. This requires paying some attention to the visual signal. An expansion constitutes an indicating device that can indicate at least three states in a way that can be differentiated for example, a two color light emitting diode that shows acceleration with a different color than deceleration and that extinguishes in the coasting state. Of course, it is possible to use other visual display means, with which the various drive states can be indicated or at least the coasting state can be signaled in a distinguishable manner. The basic advantage of this expansion lies in the driver's ability to recognize immediately upon looking at the indicating device the drive range, in which he currently is. Thus, he knows immediately whether he can reach the coasting state by depressing or releasing the drive pedal. In order to render in greater detail the real drive state, the indicator may also be designed in multiple steps for example, using a plurality of light emitting diodes or continuously, for example, using a pointer instrument. As a result, the driver can be informed additionally that he is in the vicinity of the coasting state so that he may, if desired, adapt his driving even better to an energy saving way of driving.

The advantageous feature with respect to the usage of this user interface for the purpose of indicating the coasting state is that the vehicle responds to the driver's input in the same way that he is accustomed from conventional vehicles, and that the driver may specify the desired coasting by merely using such operational control elements that are familiar to him. The only difference is that a haptic feedback signals to him that position of the drive pedal, in which the coasting related functions can be activated, by, for example, uncoupling and switching off the internal combustion engine without affecting the vehicle longitudinal dynamics. The result of the automatic activation of the coasting mode is that this mode is activated whenever it has no effect on the vehicle longitudinal dynamics. The signaling of this state to the driver enables him to adapt his driving in such a manner that coasting is used even in such driving situations that require only a slight adaptation in the driver's way of driving. Thus, an optimal and maximum use of the coasting mode and the coasting related functions is achieved.

Figure 2B:
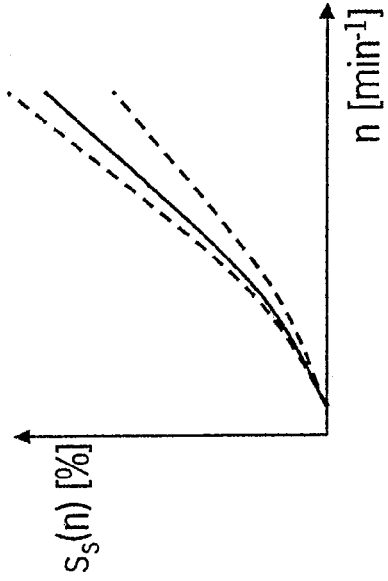
FIG. 2 is a schematic drawing of the hysteresis and the switch-off dead time for activating the coasting mode in accordance with embodiments of the present invention.
Figure 2A:
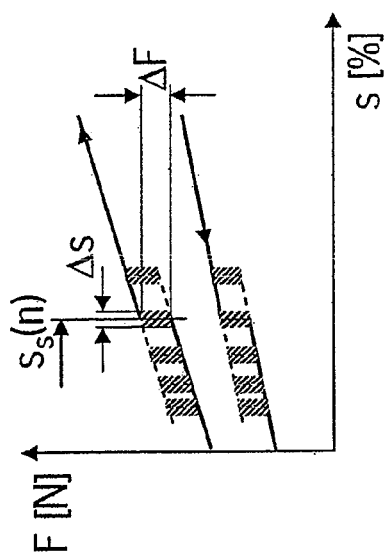

In order to avoid that the internal combustion engine is switched off too often and then is re-started again after a short period of time, the drive pedal position is provided with a hysteresis and a switch-off dead time for activating the coasting mode, as shown in FIG. 2A. The two lines in the left diagram symbolize the forward direction (push inwards, upper line) and the rearwards direction (release, bottom line) of the drive pedal activation. In other words, there is, instead of the zero torque position $s_s(n)$, a zero torque range of the drive pedal position, which the driver has to maintain for a certain period of time by activating the drive pedal, so that there is a change-over into the coasting mode. This zero torque range is shown with the shaded area in FIG. 2A. As an alternative or in addition, the limits of the zero torque range may be signaled to the driver as additional pressure points, which may be easier to overcome than the zero torque position. Thus, it is ensured that a random minor change in the drive pedal position cannot induce, for example, the engine to re-start.

In FIG. 2A there are not only the two solid graduated lines but also various dashed lines, where the force stage $\Delta F$ is located at various drive pedal positions s. This symbolizes the change in the position $s_s$ as a function of the zero torque speed, as follows from the diagram in FIG. 2B. Of course, all positions between the drawn positions are possible that is, all positions which follow from FIG. 2B.

In FIG. 2B not only the solid characteristic curves, but also two dotted lines are drawn. They symbolize a change in the characteristic curve owing to the various engine temperatures or other influencing parameters.

In addition, a switch-off dead time operational control element and/or a drive pedal hysteresis operational control element for the coasting indicating interface may also be provided. Then the result is a coasting user interface, with which the coasting related functions and thus, the coasting readiness of the driver can be adapted to the individual case. For example, this coasting user interface exhibits two end positions. In the one end position the internal combustion engine is already switched off, when the drive pedal is in the zero torque position and/or in a wide range about this position for only a short period of time ($\Delta s$ large and switch-off dead time small). In the other end position the system is totally switched off. This means in FIG. 2A, for example, $\Delta F=0$ and $\Delta s=0$ and very long switch-off dead time. Therefore, the operational control elements for the switch-off dead time and the drive pedal hysteresis may exhibit an obvious pressure/locking point in order to signal even in a haptic manner to the driver the complete switch off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a dedicated indicating device for a motor vehicle having a drive train and at least one drive unit which is disengageable from the drive train, comprising the steps of:
    determining whether the at least one drive unit is in an operating state of providing an accelerating torque into the drive train, whether the at least one drive unit is in an operating state of providing a decelerating torque into the drive train and whether the at least one drive unit is in an operating state of providing no torque into the drive train;
    providing an indication with the dedicated indicating device to the driver to indicate when the at least one drive unit is not providing an accelerating torque into the drive train and when the at least one drive unit is not providing a decelerating torque into the drive train and to indicate to the driver when a coasting mode is being approached from an acceleration range and when a coasting mode is being approached from a deceleration range so that the driver optionally can vary a driving pattern to achieve or maintain the coasting mode,
    wherein the operating state of providing an accelerating torque, a decelerating torque or no torque into the drivetrain is determined by reference to a characteristic graph of the at least one drive unit.

2. The operating method as claimed in claim 1, wherein the step of determining whether the at least one drive unit is in an operating state of providing an accelerating torque into the drive train, whether the at least one drive unit is in an operating state of providing a decelerating torque into the drive train, and whether the at least one drive unit is in an operating state of providing no torque into the drive train comprises determining an amount of torque of the drive unit delivered to the drive train when the drive unit is connected to the drive train.

* * * * *